United States Patent [19]
Brückner et al.

[11] Patent Number: 6,041,588
[45] Date of Patent: Mar. 28, 2000

[54] GAS AND STEAM TURBINE SYSTEM AND OPERATING METHOD

[75] Inventors: Hermann Brückner, Uttenreuth; Erich Schmid, Marloffstein; Wilhelm Ernstberger, Effeltrich, all of Germany

[73] Assignee: Siemens Aktiengesellschaft, Munich, Germany

[21] Appl. No.: 08/943,877

[22] Filed: Oct. 3, 1997

Related U.S. Application Data

[63] Continuation of application No. PCT/DE96/00491, Mar. 21, 1996.

[51] Int. Cl.[7] .................................................. F02C 6/18
[52] U.S. Cl. .................... 60/39.02; 60/39.182; 60/736
[58] Field of Search ............................ 60/39.02, 39.182, 60/736

[56] References Cited

U.S. PATENT DOCUMENTS

| | | | |
|---|---|---|---|
| 4,785,622 | 11/1988 | Plumley et al. | 60/39.182 |
| 4,932,204 | 6/1990 | Pavel et al. | 60/736 |
| 5,357,746 | 10/1994 | Myers et al. | 60/736 |

FOREIGN PATENT DOCUMENTS

| | | |
|---|---|---|
| 0 148 973 B1 | 7/1985 | European Pat. Off. . |
| 0 400 370 A2 | 12/1990 | European Pat. Off. . |
| 0 588 392 A1 | 3/1994 | European Pat. Off. . |
| 2 551 181 | 3/1985 | France . |
| 43 33 439 C1 | 2/1995 | Germany . |
| 95/00747 | 1/1995 | WIPO . |

*Primary Examiner*—Louis J. Casaregola
*Attorney, Agent, or Firm*—Herbert L. Lerner; Laurence A. Greenberg; Werner H. Stemer

[57] ABSTRACT

A waste-heat steam generator of a gas-turbine and steam-turbine system. The steam-generating heat content in the expanded working medium from the gas turbine is used for the steam turbine connected into a water/steam loop. Condensed steam from the steam turbine is supplied as condensate to the water/steam loop. A partial flow is diverted from the water-steam loop for selectively preheating the condensate or the fuel with the partial flow. To achieve high efficiency, irrespective of the fuel used for the gas turbine, when oil is used as the fuel for the gas turbine, the partial flow from the water/steam loop is used for condensate preheating. When gas is used as the fuel for the gas turbine, the partial flow is used for fuel preheating. A heat exchanger for the selective preheating either of the gas-turbine fuel or of the condensate with the partial flow is provided.

11 Claims, 1 Drawing Sheet

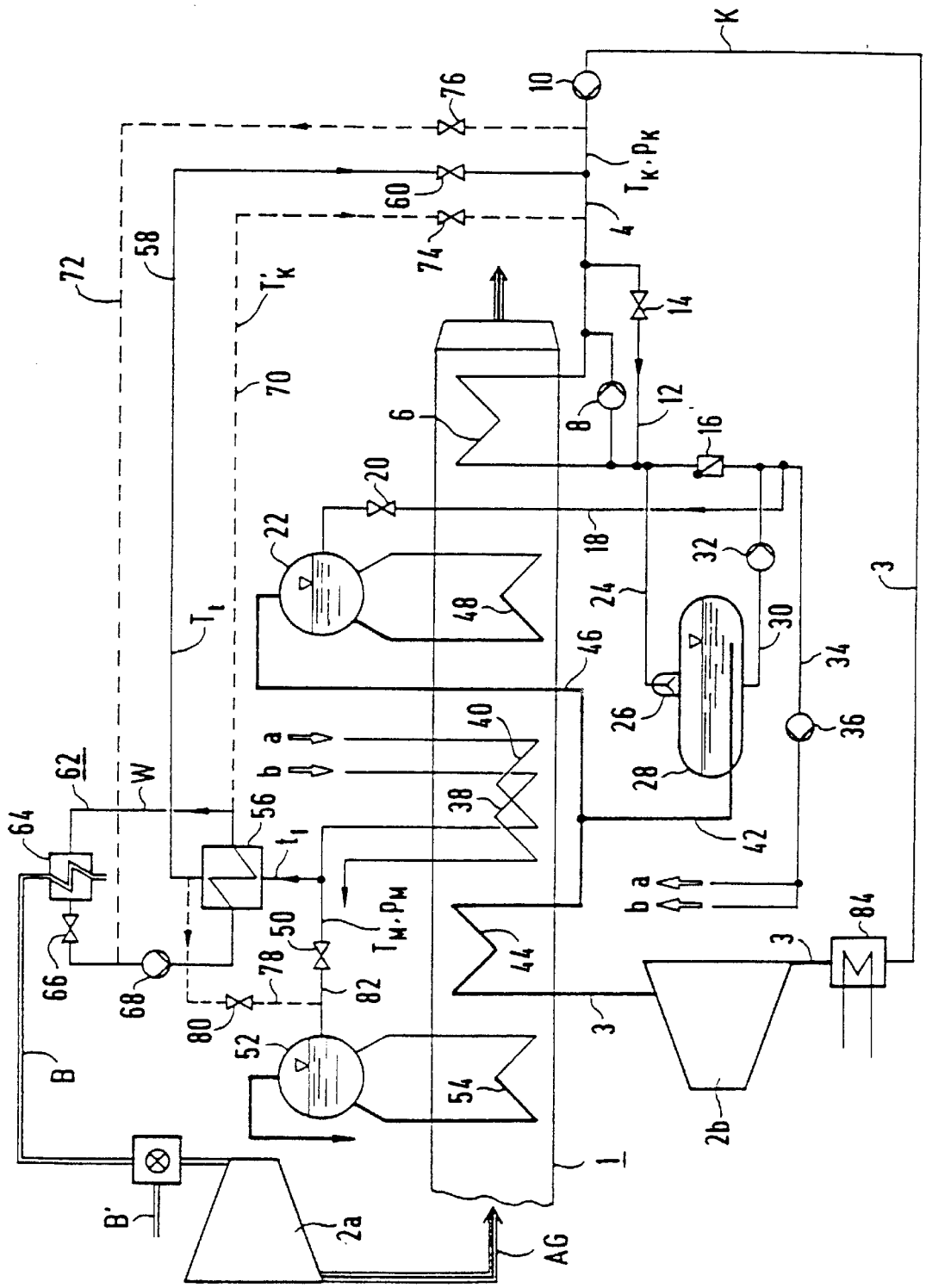

GAS AND STEAM TURBINE SYSTEM AND OPERATING METHOD

CROSS-REFERENCE TO RELATED APPLICATION

This is a continuation of International Application Ser. No. PCT/DE96/00491, filed Mar. 21, 1996.

BACKGROUND OF THE INVENTION

1. Field of the Invention

The invention pertains to a method of operating a gas and steam turbine system, in which the heat contained in the expanded working medium of an associated gas turbine that can be operated with either gas or oil as its fuel is used to generate steam for an associated steam turbine connected in a water-steam loop, in which condensed steam from the steam turbine is supplied as condensate to the water-steam loop, and in which a partial flow is diverted from the water-steam loop for preheating purposes. The method is also directed to a gas and steam turbine system operating by the novel method.

2. Description of the Related Art

A gas and steam turbine system in which the heat contained in the expanded working medium from the gas turbine is used to generate steam for the steam turbine typically includes a waste heat steam generator. The heat transfer is effected by means of a number of heating surfaces, which are arranged in the form of pipes or pipe coils in waste heat steam generators. The waste heat steam generators in turn are connected into the water-steam loop of the steam turbine. The water-steam loop includes a plurality of pressure stages, for instance two or three of them, and each pressure stage has a preheater heating surface (economizer), an evaporator heating surface, and a superheater heating surface. With this kind of gas and steam turbine system, known for instance from EP 0 148 973 B1, a thermodynamic efficiency of about 50 to 55% is achieved, depending on the pressure conditions prevailing in the water-steam loop of the steam turbine.

A gas and steam turbine system is known from French patent application FR-A 2 551 181 in which the gas turbine can be operated with either gas or oil. A partial flow is diverted from the water-steam loop of that gas and steam turbine system for preheating purposes.

A gas and steam turbine system in which heating oil is contemplated as a backup for natural gas for only a short period of operation of the gas turbine, for instance for 100 to 500 h/a, the system is designed and optimized primarily for natural gas operation of the gas turbine. In order in the heating mode to raise the feedwater temperature at its entry into the waste heat steam generator without a complicated tapping of the turbine, the necessary heat can be drawn in various ways from the waste heat steam generator itself. One possibility is to bypass a usually provided condensate preheater completely or in part and to heat the condensate in a feedwater tank, connected to the water-steam loop, by delivering low-pressure steam. However, at low steam pressures, such a method requires a large-volume and sometimes multistage hot steam system in the feedwater tank, which for long heating times can threaten a degassing function that typically takes place in the feedwater tank.

To assure effective degassing of the condensate, the condensate temperature in the feedwater tank should as much as possible be kept within a temperature range between 130 and 160° C., and the heating time of the condensate in the feedwater tank should be kept short. By way of example, this can be done by preheating the condensate via a steam-heated additional preheater. To furnish sufficient heat for this purpose, it is often necessary to draw hot water from a high-pressure economizer of the waste heat steam generator, in two- or three-pressure systems. However, especially in three-pressure systems, this has the disadvantage that a typically provided high-pressure feed pump can be varied in terms of its pumping quantity, and that the additional condensate preheater must be designed, in an especially uneconomical way, for both the high pressure and major pressure differences. In heating oil operation, throttling losses of the feed pump or of each feed pump also arise in a disadvantageous way. Moreover, drawing hot water from the high-pressure economizer reduces the high-pressure steam quantity by lowering the so-called high-pressure approach temperature, which in turn reduces the system efficiency.

SUMMARY OF THE INVENTION

It is accordingly an object of the invention to provide a method of operating a waste heat steam generator and a steam generator operating according to the method, which overcomes the above-mentioned disadvantages of the heretofore-known devices and methods of this general type and which, regardless of the fuel used for the gas turbine, especially high system efficiency is attained. It is a further object to achieve the higher efficiency at little engineering effort and expense in a gas and steam turbine system suitable for performing the method.

With the foregoing and other objects in view there is provided, in accordance with the invention, a method for operating a gas and steam turbine system, which comprises:

selectively operating a gas turbine with gas or oil as fuel and generating steam with a heat content in an expanded working medium for an associated steam turbine connected in water-steam loop;

supplying condensed steam from the steam turbine as condensate to the water-steam loop;

diverting a partial flow from the water-steam loop; and selectively preheating condensate and fuel with the partial flow.

In other words, partial flow stream can be used both for preheating condensate and for preheating fuel.

The invention is based on the premise that in a gas and steam turbine system where high efficiency is demanded, and in natural gas operation, fuel preheating is typically contemplated. This is known, in principle, from international patent disclosure WO 95/00747. There, a partial flow of heated water is drawn from the water-steam loop of the steam turbine for preheating the fuel and returned to the water-steam loop after indirect heat exchange with the fuel.

In accordance with an added feature of the invention, when gas is used as the fuel, it is not heated directly. Instead, the heat is given up to an intermediate loop, for instance via a water/water heat exchanger, so that it is the medium flowing into the intermediate loop that is first used to heat the fuel. Since when oil is used as the fuel this preheating system is not needed, it is expediently employed in the oil-fired mode for preheating condensate. In that case, the intermediate loop can be turned off. The partial flow cooled down in the condensate preheating is advantageously admixed with the condensate again.

The perceptible heat content in the exhaust gas from the gas turbine, in a water-steam loop made up of three pressure stages, i.e., a low-pressure stage, a medium-pressure stage, and a high-pressure stage, in the waste heat steam generator decreases in the flow direction of the exhaust gas from the high-pressure system through the medium-pressure system to the low-pressure system. To assure the requisite heat for the condensate preheating, both the drawing of the partial flow and the return of the partial flow are expediently done from and into the medium-pressure stage, respectively. The partial flow is expediently returned to the medium-pressure stage when as a result of the operation the low-pressure steam production falls below a predetermined value. This is expediently accomplished in that water drawn from a medium-pressure economizer and cooled down in the condensate preheating is carried not to the condensate system but rather to a medium-pressure steam drum, where it is reheated. As a result, the heat economized in terms of feedwater preheating is available for condensate preheating.

The steam production of the medium-pressure stage also drops accordingly, so that the quantity of condensate for the medium-pressure stage is also reduced.

Since with this method entry temperatures into the waste heat steam generator of up to 135° C., for instance, can be controlled, practically the entire heating oil spectrum can be covered for this purpose (backup fuel), thus making standardization possible.

With the above and other objects in view, there is also provided, in accordance with the invention, a gas and steam turbine system, comprising a condensate line connected in a water-steam loop, and a heat exchanger for selective preheating of a gas turbine fuel and for preheating the condensate by means of the partial flow from the water-steam loop.

In other words, the gas and steam turbine system having a condenser downstream of the steam turbine in a water-steam loop. Here, the invention provides for a heat exchanger suitable both for preheating of a gas turbine fuel and for preheating the condensate with the partial flow from the water-steam loop. In accordance with an additional feature of the invention, the heat exchanger is connected on the primary side downstream of a preheater heating surface, preferably a medium-pressure economizer, disposed in the waste heat steam generator.

In the event of a leak, contact is avoided for safety reasons between the fuel and the partial flow in an indirect heat exchange in that the heat exchanger for fuel preheating is advantageously connected on the secondary side into an intermediate loop. For condensate preheating, a switchover then takes place with a shutoff of the intermediate loop. In that case, the heat exchanger is connected on the secondary side to the condensate line. One or more valves allow choosing the preheating of either the gas turbine fuel or the condensate. The valve is provided, for instance, in the intermediate loop and/or in the communication between the heat exchanger and the condensate line.

Other features which are considered as characteristic for the invention are set forth in the appended claims.

Although the invention is illustrated and described herein as embodied in method for operating a gas and steam turbine system, and gas and steam turbine system operating by the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole figure of the drawing is a diagram of a detail of a waste heat steam generator, the heating surfaces of which are connected into a water-steam loop of a gas and steam turbine system.

DESCRIPTION OF THE PREFERRED EMBODIMENTS

Referring now to the figures of the drawing in detail and first, particularly, to FIG. 1 thereof, there is seen a waste heat steam generator 1 which forms part of a gas and steam turbine system for producing electrical energy. Hot exhaust gas AG from a gas turbine 2a flows through the waste steam generator and it is thereby used for steam generation. The various heating surfaces of the generator 1 are connected into a water-steam loop 3 of a steam turbine 2b.

To that end, the waste heat steam generator 1 has a condensate preheater 6, which is connected to a condensate line 4 and on its output side, via a recirculating pump 8, communicates with its own input. For bypassing the condensate preheater 6 if needed, a bypass line 12 with a valve 14 that is connected to the output of the condensate preheater 6 is connected to the condensate line 4 on the pressure side of a condensate pump 10. The condensate preheater 6 communicates on its output side with a low-pressure drum 22, via a check valve 16 and a line 18 that has a valve 20. The condensate preheater 6 also communicates on its output side, via a line 24, with a degasser tank or feedwater tank 28 that has a degasser 26. The feedwater tank 28 communicates on its output side with a recirculating pump 32 via a line 30 and both with its input and with the line 18 via the check valve 16 and the line 24. On its output side, the feedwater tank 28 also communicates via a line 34 with a feedwater pump 36—as indicated by the arrows a and b as well as with a high-pressure economizer 38 and a medium-pressure economizer 40.

For feedwater preheating, a steam line 42 discharges into the feedwater tank 28 and is connected to a steam line 46 that leads from the low-pressure drum 22 to a low-pressure superheater heating surface 44. The low-pressure superheater heating surface 44, together with the low-pressure drum 22 and a low-pressure evaporator heating surface 48 connected to the low-pressure drum 22, along with a low-pressure portion of the steam turbine 2b, forms the low-pressure stage of the water-steam loop 3.

The medium-pressure economizer 40 communicates on its output side, via a valve 50, with a medium-pressure drum 52, to which a medium-pressure evaporator heating surface 54 is connected. The medium-pressure economizer 40, together with the medium-pressure drum 52 and the medium-pressure evaporator heating surface 54 and a non-illustrated medium-pressure superheater heating surface, and a medium-pressure portion of the steam turbine 2b, form the medium-pressure stage of the water-steam loop 3.

Correspondingly, the high-pressure economizer 38 is part of a high-pressure stage, not shown in further detail, of the water-steam loop 3.

The medium-pressure economizer 40 also communicates on its output side with a heat exchanger 56, which is connected on the primary side into a primary line 58, which communicates with the condensate line 4 and in which a reducing valve 60 is located. On the secondary side, the heat exchanger 56 is connected into an intermediate loop 62 that has a further heat exchanger 64 for fuel preheating. In the intermediate loop 62 forming the fuel preheater system, a valve 66 and a pump 68 are also connected downstream of the second heat exchanger 64. A first line 70, shown in dashed lines, and a second line 72, also shown in dashed lines, are also connected to the intermediate loop 62, or in other words to the secondary side of the heat exchanger 56. The first line 70 discharges into the condensate line 4 via a valve 74. The second line 72, into which a valve 76 is incorporated, connects the condensate line 4 to the intake side of the pump 68 incorporated in the intermediate loop 62. Connected to the primary line 58 of the heat exchanger 56 is a line 78, again shown in dashed lines, that has a valve 80 and that discharges into a line 82 that connects the medium-pressure economizer 40 with the medium-pressure drum 52.

In operation of the waste heat steam generator 1, the condensate preheater 6 is supplied, via the pump 10 and the condensate line 4, with condensate k from the condenser 84 downstream of the steam turbine. The condensate preheater 6 can be bypassed entirely or in part by the line 12. The temperature $T_K$ is approximately 25 to 40° C. The condensate pressure $p_K$ is approximately 10 to 20 bar. The condensate K is heated in the condensate preheater 6 and to that end is recirculated at least in part via the recirculating pump 8. The heated condensate K is carried in part or entirely via the line 24 into the feedwater tank 28 or degasser 26, where heating of the feedwater, by means of steam carried via the line 42, and degassing of the condensate K take place. The heated feedwater is delivered on the one hand to the low-pressure drum 22 and on the other, via the feedwater pump 36, to the medium-pressure economizer 40 and, at increased pressure, to the high-pressure economizer 38. The feedwater delivered to the low-pressure stage is evaporated at low pressure in the low-pressure evaporator heating surface 48; the steam at low pressure, separated off in the low-pressure drum 22, is delivered partly to the feedwater tank 28 and partly to the low-pressure superheater heating surface 44. The steam superheated there is delivered to the low-pressure portion of the steam turbine 2b.

The feedwater, at a medium pressure $p_M$ of about 40 to 50 bar is also delivered, at a temperature $T_M$ of approximately 220 to 240° C. to the medium-pressure drum 52 and evaporated in the medium-pressure evaporator heating surface 54. The steam at medium pressure separated out in the medium-pressure drum 52 is delivered to the medium-pressure portion of the steam turbine 2b. In an analogous way, the feedwater at high pressure and heated in the high-pressure economizer 38 is evaporated and delivered in the superheated state to the high-pressure portion of the steam turbine 2b.

A partial flow $t_1$ drawn from the water-steam loop 3 is carried via the heat exchanger 56 and cooled down there. The cooled partial flow $t_1$ is returned to the water-steam loop 3 again. The return of the cooled partial flow $t_1$ can take place either via the line 58, by admixture with the condensate k, or via the line 78, by feeding into the medium-pressure drum 52. For the switchover, the valves 60 and 80 are provided. The cooling down of the partial flow $t_1$ takes place by indirect heat exchange in the heat exchanger 56.

When gas is used as the gas turbine fuel B, the heat exchange of the partial flow $t_1$ in the heat exchanger 56 is accomplished with a medium W circulated in the intermediate loop 62, preferably water, which gives this heat up again to the gas turbine fuel B via the second heat exchanger 64.

When oil is used as the gas turbine fuel B', the intermediate loop 62 is turned off via the valve 66, and the heat exchange of the partial flow $t_1$ in the heat exchanger 56 is effected with condensate K delivered to the heat exchanger 56 via the line 72. After cooling down in the heat exchanger 56, this condensate is admixed again, via the line 70, with the condensate K flowing via the condensate line 4. In the process, the partial flow $t_1$ is cooled down to a temperature $T_t$ of about 50° C., and the condensate K flowing out of the heat exchanger 56 on its secondary side via the line 70 is heated to a temperature $T_{K'}$ of approximately 100 to 180° C. Thus the partial flow $t_1$ used for fuel preheating when gas is used as the fuel B for the gas turbine 2a is utilized for condensate preheating when oil is used as the fuel B' for the gas turbine 2a.

By using the fuel preheater system 62, 68, substantially comprising the heat exchanger 56 and not needed in oil-fired operation, for preheating the condensate, the previously needed withdrawals from the water-steam loop 3, and particularly from the high-pressure economizer 38, no longer need to be made. Moreover, external condensate preheating, including the pipelines and fixtures required for this and an appropriate controller can also be dispensed with. Thus both in gas-fired and oil-fired operation, especially high system efficiency is achieved. A switchover from fuel preheating to condensate preheating can be accomplished in a simple way.

We claim:

1. A method for operating a gas and steam turbine system, which comprises:
   selectively operating a gas turbine with gas or oil as fuel and generating steam with a heat content in an expanded working medium for an associated steam turbine connected in a water-steam loop;
   supplying condensed steam from the steam turbine as condensate to the water-steam loop;
   diverting a partial flow from the water-steam loop; and
   selectively preheating condensate and fuel with the partial flow, wherein the preheating step comprises preheating fuel by an indirect heat exchange via an intermediate circuit.

2. A method for operating a gas and steam turbine system, which comprises:
   selectively operating a gas turbine with gas or oil as fuel and generating steam with a heat content in an expanded working medium for an associated steam turbine connected in a water-steam loop;
   supplying condensed steam from the steam turbine as condensate to the water-steam loop;
   diverting a partial flow from the water-steam loop;
   selectively preheating condensate and fuel with the partial flow, wherein the preheating step comprises preheating condensate, and further comprises switching off an intermediate loop otherwise used in preheating fuel.

3. A method for operating a gas and steam turbine system, which comprises:
   selectively operating a gas turbine with gas or oil as fuel and generating steam with a heat content in an expanded working medium for an associated steam turbine connected in a water-steam loop;
   supplying condensed steam from the steam turbine as condensate to the water-steam loop;
   diverting a partial flow from the water-steam loop;
   selectively preheating one of condensate and fuel with the partial flow; and
   admixing the partial flow cooled down in the condensate preheating step with the condensate.

4. A method for operating a gas and steam turbine system, which comprises:

selectively operating a gas turbine with gas or oil as fuel and generating steam with a heat content in an expanded working medium for an associated steam turbine connected in a water-steam loop having three pressure stages with a medium-pressure stage;

supplying condensed steam from the steam turbine as condensate to the water-steam loop;

drawing a partial flow from the medium-pressure stage of the water-steam loop; and selectively preheating one of condensate and fuel with the partial flow.

5. The method according to claim 4, wherein the preheating step comprises preheating the condensate and thereby cooling down the partial flow, and the method further comprises returning the cooled partial flow to the medium-pressure stage of the water-steam loop.

6. A gas and steam turbine system, comprising a condensate line connected in a water-steam loop, and a heat exchanger for selective preheating of a gas turbine fuel and for preheating the condensate by means of a partial flow from the water-steam loop.

7. The gas and steam turbine system according to claim 6, wherein the heat exchanger has a primary side connected downstream of a preheater heating surface.

8. The gas and steam turbine system according to claim 7, wherein said heat exchanger has a secondary side connected into an intermediate loop for preheating the gas turbine fuel.

9. The gas and steam turbine system according to claim 6, wherein said heat exchanger has a secondary side connected into an intermediate loop for preheating the gas turbine fuel.

10. The gas and steam turbine system according to claim 6, wherein said heat exchanger has a secondary side connected to the condensate line for condensate preheating.

11. The gas and steam turbine system according to claim 6, which further comprises at least one valve for affording a choice between preheating the gas turbine fuel or the condensate.

* * * * *

UNITED STATES PATENT AND TRADEMARK OFFICE
CERTIFICATE OF CORRECTION

PATENT NO : 6,041,588
DATED : March 28, 2000
INVENTOR(S) : Hermann Brückner et al.

It is certified that error appears in the above-identified patent and that said Letters Patent is hereby corrected as shown below:

On the title page:

Item [30] should read as follows:

Apr. 3, 1995     [DE]   Germany .......... 195 12 466.9

Signed and Sealed this

Twentieth Day of February, 2001

Attest:

NICHOLAS P. GODICI

Attesting Officer     Acting Director of the United States Patent and Trademark Office